United States Patent [19]

Wiechard

[11] Patent Number: 4,524,516
[45] Date of Patent: Jun. 25, 1985

[54] MOLDED PLASTIC ARTICLE HAVING METALLIC INSERTS

[75] Inventor: Charles A. Wiechard, Tucker, Ga.

[73] Assignee: AT&T Technologies, Inc., Berkeley Heights, N.J.

[21] Appl. No.: 398,452

[22] Filed: Jul. 14, 1982

Related U.S. Application Data

[62] Division of Ser. No. 191,628, Sep. 29, 1980, Pat. No. 4,354,995.

[51] Int. Cl.³ ............... B26B 29/00; B32B 15/08; B32B 15/04
[52] U.S. Cl. ................................... 30/290; 30/294; 428/461; 428/457; 264/250; 264/275
[58] Field of Search ............... 428/461, 457; 264/250, 264/275; 30/289, 286, 294

[56] References Cited

U.S. PATENT DOCUMENTS

| | | | |
|---|---|---|---|
| 2,610,399 | 9/1952 | Adams et al. | 30/288 |
| 3,983,205 | 9/1976 | Barrett | 264/275 |
| 3,991,146 | 11/1976 | Barrie | 428/461 |
| 4,291,463 | 9/1981 | Williams | 428/461 |

Primary Examiner—George F. Lesmes
Assistant Examiner—Beverly K. Johnson
Attorney, Agent, or Firm—E. W. Somers

[57] ABSTRACT

A composite article of this invention is made by successive molding steps and comprises an insert assembly that includes a metallic portion and a plastic locating framework in which the metallic portion is precisely mounted with respect to references points on the locating framework. The locating framework is mounted within a housing with the insert assembly precisely positioned with respect to the housing to cause the metallic portions to be substantially precisely positioned with respect to an external surface of the housing. In one embodiment, which is a hand tool that is moved slidably along a connector to sever conductors, a cutting blade is substantially precisely positioned in the locating framework of the insert assembly. Plastic is flowed about the framework in a mold cavity to form the housing. Since the framework is positioned substantially precisely with respect to mold surfaces which define the housing, the cutting blade is substantially precisely positioned with respect to an external surface of the housing and avoids damage to the connector when the tool is moved therealong.

4 Claims, 7 Drawing Figures

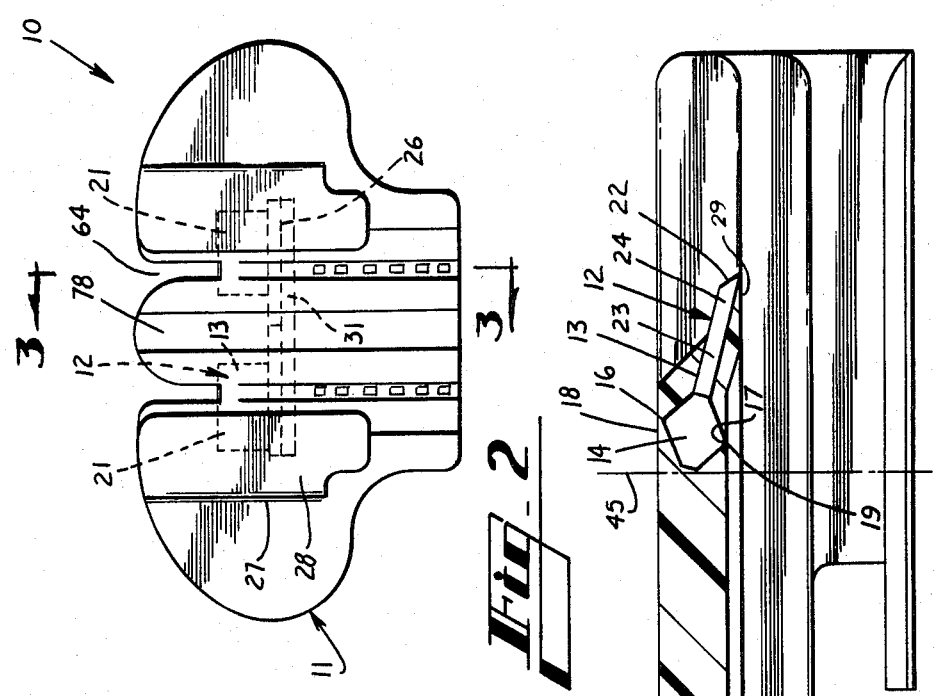
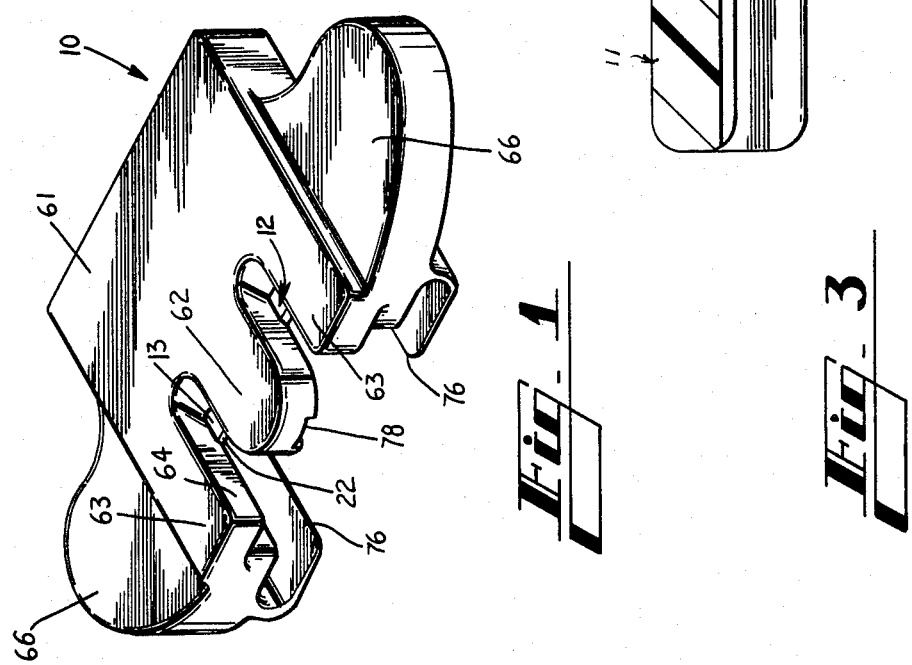

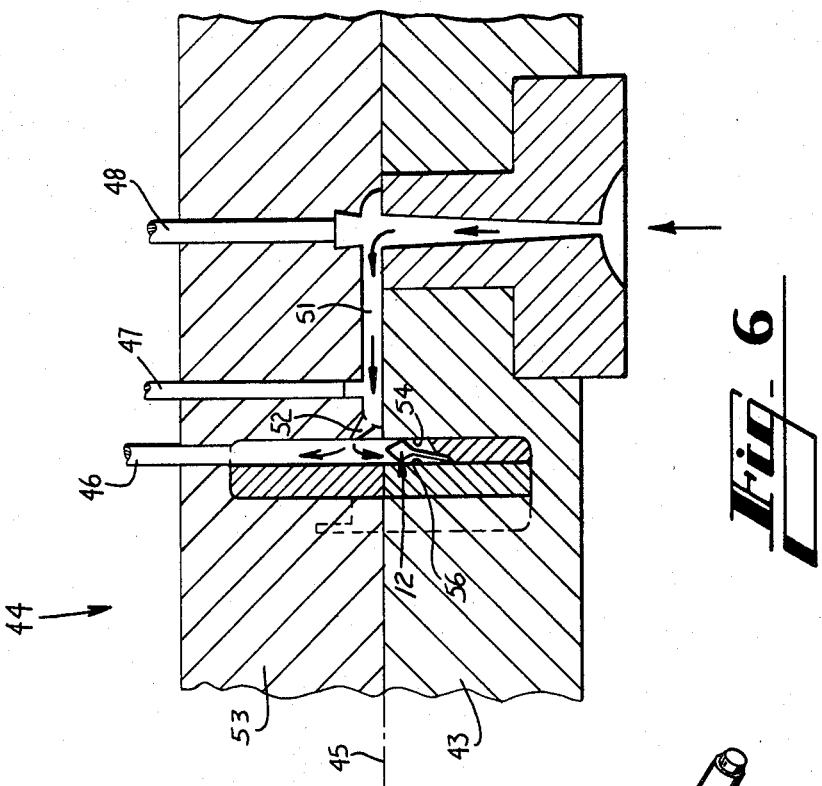
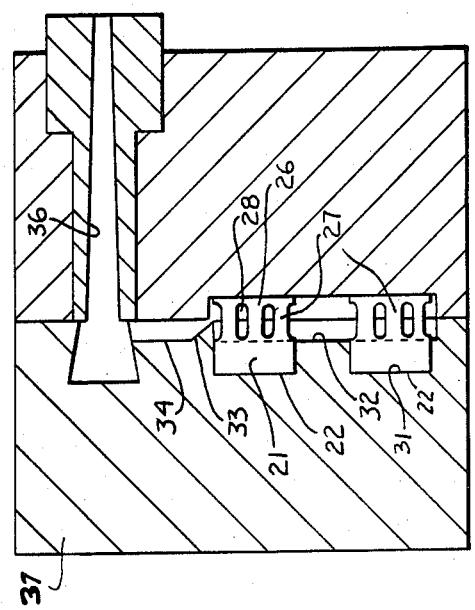
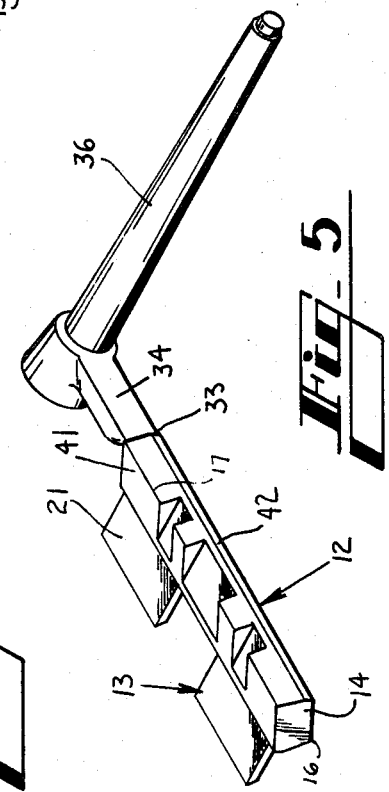

MOLDED PLASTIC ARTICLE HAVING METALLIC INSERTS

This is a division, of application Ser. No. 191,628 filed Sept. 29, 1980, now U.S. Pat. No. 4,354,995.

TECHNICAL FIELD

This invention relates to a molded plastic article having a metallic insert, and, more particularly, to a molded plastic hand tool having a cutting element mounted therein and accurately positioned with respect to external surfaces of the tool.

BACKGROUND OF THE INVENTION

The marketplace abounds with multiconductor connectors which are used, for example, to interconnect corresponding conductors of communication cables. These kinds of connectors are shown, for example in U.S. Pat. No. 3,772,635 which issued on Nv. 13, 1973 in the names of D. R. Frey et al, 3,858,158 which issued on Dec. 31, 1974 in the names of R. W. Henn et al and 4,099,822 which issued on July 11, 1978 in the names of A. W. Carlisle et al.

Connectors of the type shown in the above-identified patents fulfill the interconnection needs in modern telephone central offices as well as in the field. One of those connectors includes an index strip along which a pluraity of insulated conductors from a first cable are fanned out into separate, parallel conductor-receiving openings. A connector module having a plurality of spaced metallic contact elements which include opposed, bifurcated portions is mounted on the index strip to cause depending portions of the contact elements to electrically engage the conductors which are held in the index strip. Then the insulated conductors of a second cable which is to be spliced to the first are fanned out in conductor-receiving openings of the connector module such that they enter slots in the opposite ends of the contact elements and thereby become connected to corresponding conductors in the index strip.

Another need is that of providing a connector which may be used in an operation which is referred to as half-tapping. A cable which extends from customers' station equipment to central office equipment is cut and reconnected to other, generally more sophisticated central office equipment. Obviously, such an operation must be accomplished with minimum disruption to customer service.

In a first step of a half-tapping operation, a group of conductors of the cable are fanned out into the index strip of the above-identified splicing connector. The connector module is mounted on the index strip and conductors of a cable which is connected to the replacing equipment are moved into the openings of the module. Then a craftsperson severs the conductors on that side of the index strip from which they are routed to the equipment which is being replaced. The severing of the insulated conductors has generally been accomplished on an individual conductor basis by the craftsperson using pliers having cutting jaws. This is time consuming and tedious, particularly when one considers that the number of conductors in a cable may be in the thousands.

The task of severing the conductors in a half-tap operation may be simplified by using a hand tool which is adapted to be mounted slidably with respect to a portion of the connector and which includes a cutting element. With such an arrangement, the craftsperson need only mount the tool on the connector and then move it slidably therealong to sever the conductors.

This tool simplifies, the worksteps, but there is a problem that relates to the manufacture of the tool. Generally, a tool such as this is molded from a plastic material with a metallic cutting blade being mounted within the plastic material to effect the cutting. The problem is to be able to position the blade prior to molding with sufficient accuracy so that when the tool is mounted on the connector and moved therealong, the blade will be aligned to sever the conductors without cutting into the plastic portions of the connector. Also, the exposure of the metallic blade along that surface of the tool which is adjacent a surface of the connector from which the conductors extend for cut off must be minimal. Otherwise, the relatively close spacing of the conductors, i.e. about 0.3 cm or even less, could result in a circuit path being established between adjacent conductors by way of the blade.

Since the exposure of the blade to one surface of the tool must be minimized, the molding of the tool with the blade being accurately positioned with respect to external surfaces of the tool is extremely costly by prior art methods. In the mold cavity, the blade could be supported by opposing core pins, which are conventional in the molding art, but steps would have to be taken to ensure against movement of the blade under the influence of the injected plastic. Also, the use of core pins requires the accurate positioning of the blade with respect to the axes of the core pins. Of no less concern is the presence of openings in the tool body which are occasioned by the withdrawal of the core pins and which undesirably provide access to the blade for electrical shorting.

The prior art does not appear to include a solution for this problem. A prior art tool which includes a cutting blade that is specified to be accurately positioned with respect to its plastic housing is shown in U.S. Pat. No. 2,610,399. For the reasons set forth hereinabove, it has been been found that it is very difficult and expensive to make such a tool that indeed has the blade accurately positioned therein. There is a need for a tool which is capable of being mounted on a connector and moved relative thereto and which includes a blade that has been accurately assembled to the tool housing without undue expense.

SUMMARY OF THE INVENTION

The foregoing problem has been overcome by a composite article of this invention which is made by successive molding steps and which comprises an insert assembly that includes a metallic portion and a plastic locating framework. The metallic portion is precisely mounted with respect to reference points on the locating framework. The metallic portion includes a portion that extends from the locating framework. The locating framework is mounted within a plastic housing with the insert assembly precisely positioned with respect to the housing to cause the metallic portion to be substantially precisely positioned with respect to an external surface of the housing. A tool in accordance with this invention includes a plastic portion and a metallic portion, the metallic portion being accurately positioned with respect to the plastic portion. The tool includes an insert assembly which comprises a locating framework that is made from a plastic material and at least one metallic portion which is precisely positioned with respect to reference points of the framework. The tool also includes a housing in which is mounted the insert assembly. The insert assembly is precisely positioned with respect to the housing to position the at least one metallic portion precisely with respect to the housing.

In a method of enclosing a tool of this invention a cutting blade is accurately positioned within a plastic housing so that the mounting of the tool on a workpiece accurately positions the blade with respect to the workpiece. A metallic blade is assembled to a locating framework which is made of a plastic material with the blade being accurately positioned with respect to reference points of the locating framework. Then the locating framework is positioned within a mold cavity with reference points of the framework being adjacent to surfaces of the mold. The reference points are adjacent to the mold surfaces which define the housing. Plastic material is flowed to encapsulate the framework and is flowed to cause forces to be applied to the framework in a direction to seat the framework in engagement with the mold surfaces which define the housing to cause the metallic portion to be precisely positioned with respect to the housing.

The positioning of a plastic carrier rather than a relatively small insert such as, for example, a cutting blade is a far simpler task for molding and results in a product having substantially accurate dimensions.

BRIEF DESCRIPTION OF THE DRAWINGS

Other features of the present invention will be more readily understood from the following detailed description of the specific embodiments thereof when read in conjunction with the accompanying drawings, in which:

FIG. 1 is a perspective view of a tool of this invention;

FIG. 2 is a plan view of the tool of FIG. 1;

FIG. 3 is an enlarged elevational view partially in section of the tool of FIG. 2 and taken along lines 3—3 thereof;

FIG. 4 is a sectional view of a mold cavity which is used to mold a locating framework about a pair of metallic cutting blades;

FIG. 5 is a perspective view of the product which is formed by the mold cavity of FIG. 4 and which is referred to as an insert assembly;

FIG. 6 is a sectional view of a mold cavity which is used to mold a housing about the insert assembly of FIG. 5.

DETAILED DESCRIPTION

Figure 7:
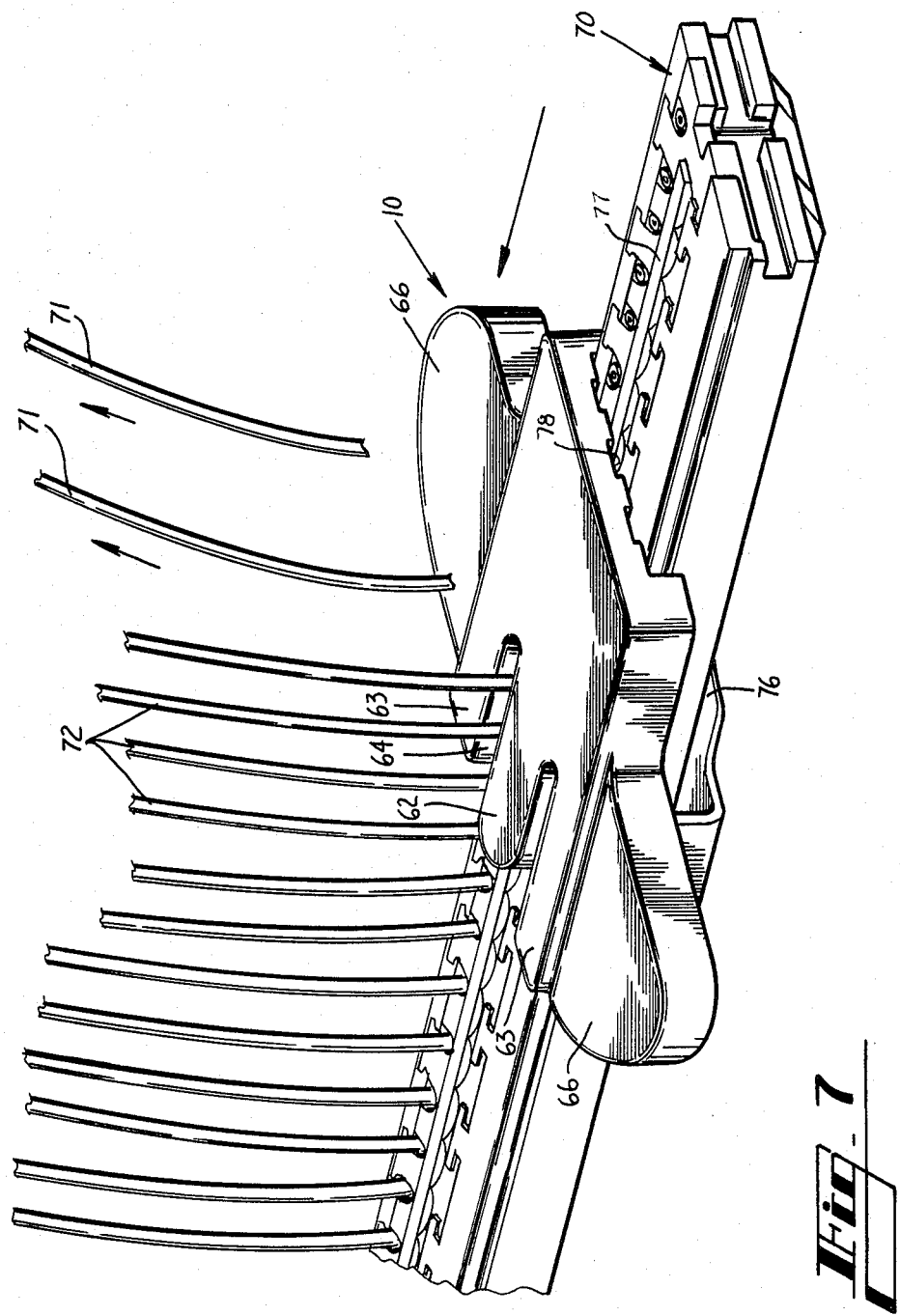
FIG. 7 is a perspective view of a tool of this invention mounted on a connector to sever conductors which are connected to the connector.

Referring now to FIG. 1, there is shown a tool of this invention, said tool being designated generally by the number 10. The tool 10 is a composite product comprising plastic portions and a metallic portion and in accordance with this invention has the metallic portion precisely positioned with respect to reference points on surfaces of the plastic portions. This allows uses of the tool in which the engagement of the tool with products to be worked on results in the metallic portions of the tool being precisely positioned with respect to portions of those products.

The tool 10 includes a housing 11 (see also FIGS. 2 and 3) which is designed to be engaged in a specific manner with a connector of the type described in U.S. Pat. No. 3,858,158. The tool 10 also includes an insert assembly 12 which includes a metallic portion 13 and a locating or gauging framework 14. The metallic portion 13 is mounted within the locating framework 14 such that it is substantially precisely positioned therein with respect to reference points 16 and 17 on externally facing surfaces of the framework. Moreover, the locating framework 14 is mounted within the housing 11 such that the reference points 16 and 17 of the locating framework 14 are precisely positioned with respect to reference points 18 and 19 of engaging surfaces of the housing. This results in the precise positioning of the metallic portion 13 in the insert assembly with respect to the reference points 18 and 19 of the housing 11.

Turning again to FIG. 1 as well as to FIGS. 2 and 3, it can be seen that the metallic portion 13 of the insert assembly 12 includes a pair of spaced cutting blades 21—21 each of which has a beveled cutting edge 22. Each of the blades 21—21 has a portion 23 which is encapsulated in the locating framework 14 and a portion 24 which projects therefrom. The portion 23 which is encapsulated in the plastic of the framework 14 comprises a portion 26 (see FIG. 4) which is parallel to the cutting edge 22 and a plurality of connecting portions 27—27 having openings 28—28 therebetween.

In the final assembly of the tool 10, the cutting edges 22—22 must be positioned precisely with respect to portions of the housing 11. Since as can be seen especially in FIG. 3, the cutting blades 21—21 are positioned so that they are inclined slightly, e.g. on the order of 15°, from the axis of the tool, it would be prohibitively expensive to position the blades within a mold so that plastic is flowed thereabout while maintaining their position with respect to the mold. This is especially true because of the relatively small size of the blades. Thisproblem is complicated by the requirement that the exposure of the beveled cutting edges 22—22 to a surface 29 of the housing 11 is minimized.

In accordance with the invention which includes successive molding steps, the cutting blades 21—21 are mounted in spaced nests 31—31 (see FIG. 4) of a mold cavity 32 which is connected through a gate 33 and runner 34 to a sprue 36 that is fed by a nozzle. Typically, the plastic which comprises the insert framework 14 is a nylon plastic material, but may be made from other plastics as well. After the blades 21—21 have been positioned in a movable portion 37 of the mold and plastic flowed through gate 33 into the cavity 32, the insert assembly 12 comprising the blades 21—21 and the framework 14 is removed from the molding press. Generally, the plastic sprue 36 and runner 34 are attached to the insert assembly but are easily detached therefrom at the gate.

The mold cavity 32 is made so that when the blades 21—21 are supported within the cavity, the flowed plastic forms a framework 14 having specially characterized portions 41—41 (see FIG. 5). These portions 41—41 which in the preferred embodiment comprises lines 16 and 17 are spaced a predetermined distance from portions of the blades 21—21 and have a specific disposition with respect to a reference line 42. Moreover, the portions of the blades 21—21 which are encapsulated by the framework 14 have a specific angular orientation relative to the framework.

While in the preferred embodiment of the tool 10, the insert assembly 12 is made by a molding step, the invention is not so limited. Instead of making the tool 10 by sucessive molding operations, other combinations of steps are included in this invention. For example, the insert assembly 12 may be made by pressing a plurality of blades 21—21 or other metallic portions in other kinds of compositely arranged articles into seated engagement with the framework 14 so that they are supported therein in precise position with respect to their plastic support.

In the next step of the method of this invention, the insert assembly 12 is mounted within a stationary cavity 43 (see FIG. 6) of a mold 44 such that its externally facing reference line 42 is flush with a plane which contains a parting line 45 of the mold. As can be seen in FIG. 6, the mold 44 also includes ejector pins 46, 47 and 48.

A second plastic material which may be, but which is not necessarily, the same as the first plastic material is flowed along a runner 51 into the cavity along the direction of a gate line 52 as seen in FIG. 6. It will be observed that the flow line is directed rearwardly into a movable part 53 of the mold cavity. After the plastic has filled this portion of the cavity 53 it is redirected in an opposite direction toward the insert assembly 12.

When the flowing plastic engages the insert assembly, several things occur. First, since the insert assembly 12 is seated in engagement with portions of the mold such that it is fixed relative to the parting line 45, it causes the flowing plastic to divide into streams which continue to flow to fill the remainder of the mold cavity 43. More importantly, the plastic begins to solidify about the insert assembly 12. This occurs while the flowing plastic causes forces to be applied to heretofore somewhat loosely supported insert assembly 12 to seat it in firm engagement with surfaces 54 and 56 of the mold cavity.

It was mentioned hereinabove that the second plastic material which forms the housing 11 may be the same as or different than the first plastic material. For example, the second may have a melting point which is less than that of the first. In that case, when the second plastic is flowed about the locating framework 14, the first plastic does not melt and the locating framework is secured within the housing 11 by a mechanical bond. In the alternative, the plastic materials could be selected so that the melting point of the first is less than that of the second. Then, when the second plastic material is injected about the locating framework 14, a fusion bond is created between the two plastic materials.

This arrangement results in a substantially precise positioning of the insert assembly 12 with respect to reference points of the housing 11. Since the metallic blades 21—21 are accurately positioned with respect to the insert assembly 12, the blades become accurately positioned with respect to the housing 11.

Turning again to FIGS. 1-3, it is seen that the final housing 11 which is removed from the mold 44 includes a main body 61 having a center portion 62 and two side portions 63—63. A conductor-receiving slot 64 is formed between the center portion 62 and each of the side portions 63—63. A finger gripping ear 66 extends laterally from each of the side portions 64—64 and is curved to facilitate engagement by a user's fingers.

The housing 11 is molded to be mounted on a specific product, namely a connector 70 shown in the above-identified U.S. Pat. No. 3,858,158 and in FIG. 7 of the drawings herein. Moreover, it is adapted to be moved slidably along that connector 70 to sever unneeded portions 71'71 of conductors 72—72 that are assembled to the connector. These conductors generally extend perpendicularly from the connector for a very short distance and are then turned or dressed toward the connector.

Specific provisions for using this tool 10 is this fashion include a pair of relatively thin resilient spring retainers 76—76 that extend downwardly from the ears 66—66 and the inwardly toward each other. These fingers facilitate retention of the tool 10 on the connector (See FIG. 7) after it has been mounted in one end thereof. Also, when a connector of this kind is assembled, two portions are heat-staked together with contact elements held therebetween. The heat-staking leaves short, pin-like projections 77—77 extending from the connector which could impede the slidable movement of the tool 10 along the connector. This is overcome by providing a clearance groove 78 in the underside of the center portion.

The use of the tool 10 to sever ends of conductors 72—72 is shown in FIG. 7. As is seen in FIG. 7, only one of the slots 64—64 and hence only one of the blades 21—21 which protudes into the slots is used in a cutting operation. The tool 10 is provided with two slots so that the tool may be mounted to be moved slideably in either direction. This is important since severance of the condutors 72 is best done "against the grain", that is to move the pool 10 in a direction opposed to that in which the conductors are dressed.

It should be understood that the just described embodiments merely illustrate principles of the invention in selected, preferred forms. Many modifications, additions and deletions may, of course, be made thereto without departure from the spirit and scope of the invention as set forth in the following claims.

What is claimed is:

1. A tool which comprises a plastic portion and a metallic member, said tool comprising:
   an insert assembly which comprises:
      a metallic member; and
      a locating framework which is made of a plastic material and which is molded about at least a portion of said metalic member to support said metallic member with a portion of said metallic member extending from said locating framework, said metallic member being positioned in a predetermined manner with respect to reference points of said framework; and
      a housing which is made of a plastic material and which encloses said insert assembly, said reference points of said locating framework being positioned in a predetermined manner with respect to external surfaces of said housing to cause said metallic member to be positioned in a predetermined manner with respect to said housing and to expose at least a surface of said portion of said metallic member which extends from said locating framework.

2. The article of claim 1, wherein said locating framework of said insert assembly is made of a first plastic material and said housing is made of a second plastic material.

3. The article of claim 2, wherein said first plastic material has a melting point which is less than the melting point of the second plastic material and said second plastic material is molded about said first plastic material.

4. A cutting tool which is capable of being mounted on a connector and of being moved thereon to sever conductors which extend from the connector, said tool comprising:

a locating framework which is made of a plastic material and which includes reference points disposed in the edges of said framework;

a cutting blade which is supported by said locating framework and which extends therefrom, said cutting blade being supported by said locating framework such that it is in a predetermined orientation with respect to said reference points; and a housing which is made of a plastic material and which encloses said locating framework in a manner to cause said edges of said locating framework to intersect external surfaces of said housing and thereby position said cutting blade in a predetermined manner with respect to said housing with a portion thereof extending beyond said housing, said housing including means for mounting said tool for movement on a connector to cause the exposed portion of the cutting blade to sever the conductors which extend from the connector.

* * * * *